(12) United States Patent
Toncelli

(10) Patent No.: US 12,728,564 B2
(45) Date of Patent: Sep. 8, 2026

(54) METHOD AND PLANT FOR MANUFACTURING ARTICLES MADE OF COMPOSITE STONE MATERIAL AND DEVICE FOR DISTRIBUTING A MIX FOR SUCH MANUFACTURING

(71) Applicant: Luca Toncelli, Bassano del Grappa (IT)

(72) Inventor: Luca Toncelli, Bassano del Grappa (IT)

(*) Notice: Subject to any disclaimer, the term of this patent is extended or adjusted under 35 U.S.C. 154(b) by 0 days.

(21) Appl. No.: 17/276,861

(22) PCT Filed: Sep. 17, 2019

(86) PCT No.: PCT/IB2019/057800
§ 371 (c)(1),
(2) Date: Mar. 17, 2021

(87) PCT Pub. No.: WO2020/058834
PCT Pub. Date: Mar. 26, 2020

(65) Prior Publication Data

US 2022/0048216 A1 Feb. 17, 2022

(30) Foreign Application Priority Data

Sep. 18, 2018 (IT) ........................ 102018000008696

(51) Int. Cl.
*B28B 3/12* (2006.01)
*B28B 3/02* (2006.01)
*B28B 13/02* (2006.01)
*C04B 32/00* (2006.01)

(52) U.S. Cl.
CPC .............. *B28B 3/126* (2013.01); *B28B 3/022* (2013.01); *B28B 13/027* (2013.01); *C04B 32/00* (2013.01)

(58) Field of Classification Search
None
See application file for complete search history.

(56) References Cited

U.S. PATENT DOCUMENTS

2005/0213429 A1* 9/2005 Izzo .................. B01F 35/71705 366/349
2010/0072034 A1* 3/2010 Swinderman ...... B65G 21/2081 198/836.3

FOREIGN PATENT DOCUMENTS

CN 201544344 U 8/2010
CN 102343623 A 2/2012
CN 202540465 U 11/2012

(Continued)

OTHER PUBLICATIONS

Machine English translation of CN102343623A, Accessed Sep. 15, 2022 (Year: 2012).*

(Continued)

*Primary Examiner* — S. Behrooz Ghorishi
(74) *Attorney, Agent, or Firm* — Fredrikson & Byron, P.A.

(57) ABSTRACT

A distributor device (1) for distributing a mix (L) in one or more forming supports (S) for manufacturing articles made of composite stone material. The device (1) comprises mix supply means (10) designed to transport the mix (L) along a longitudinal feeding direction (X) towards the forming supports (S). The distribution device (1) further comprises mix lamination means (16) located between the supply means (10) and the supports (S). The invention also relates to a method and a plant for manufacturing articles made of composite stone material which use the aforementioned distributor device (1).

23 Claims, 12 Drawing Sheets

(56) References Cited

FOREIGN PATENT DOCUMENTS

| | | | | |
|---|---|---|---|---|
| CN | 202540466 | U | | 11/2012 |
| CN | 107671985 | A | * | 2/2018 |
| EP | 1556197 | A | | 7/2005 |
| EP | 1802430 | A | | 7/2007 |
| EP | 2167295 | A | | 3/2010 |
| EP | 2406046 | A | | 11/2012 |
| FR | 897942 | A | | 4/1945 |
| FR | 1564693 | A | | 4/1969 |
| JP | 2001162612 | A | | 6/2001 |
| WO | 2004011220 | A1 | | 2/2004 |
| WO | 2017118901 | A1 | | 7/2017 |

OTHER PUBLICATIONS

Machine English translation of JP2001162612, Accessed Dec. 5, 2022 (Year: 2001).*

Machine English translation of FR1564693, Accessed Dec. 5, 2022 (Year: 1968).*

PCT International Search Report and Written Opinion dated Feb. 13, 2020 for International Application No. PCT/IB2019/057800, from which the instant application is based, 12 pgs.

Italian Search Report and Written Opinion dated Jun. 14, 2019 for Italian Patent Application No. IT 201800008696, 8 pgs.

* cited by examiner 9
27
8
25
L
L2
14
7
110
4
F
10
L1

METHOD AND PLANT FOR MANUFACTURING ARTICLES MADE OF COMPOSITE STONE MATERIAL AND DEVICE FOR DISTRIBUTING A MIX FOR SUCH MANUFACTURING

RELATED APPLICATIONS

This application is a 35 U.S.C. 371 national stage filing from International Application No. PCT/IB2019/057800, filed Sep. 17, 2019, which claims priority to Italian Application No. 102018000008696, filed Sep. 18, 2018, the teachings of which are incorporated herein by reference.

FIELD OF THE INVENTION

The present invention relates to the manufacture of articles made of composite stone material, where the term "articles" is understood as meaning preferably slabs.

The present invention relates primarily to a distributor device for distributing a mix in one or more forming supports for manufacturing articles made of composite stone material.

Furthermore, the present invention relates to a method and a plant for manufacturing articles made of composite stone material from the mix, which use the aforementioned distributor device.

BACKGROUND

In particular, the mix contains mainly granules, powders or fillers consisting of natural or synthetic stone material and a binder of the cementitious, ceramic or synthetic resin type.

For a long time now, for the manufacture of slabs of composite stone material, methods and plants in which the mix is deposited so as to form a layer on a temporary support have been known.

Subsequently, the support is transferred to a station for compaction, which is preferably performed by means of vacuum vibro-compression, following which the slab passes to a hardening station, the characteristics of which vary depending on the type of binder which, as already mentioned, may be of the cementitious, ceramic or synthetic resin type.

For example, if the binder is a synthetic resin, the rough slab resulting from compaction, preferably by means of vacuum vibro-compression, is inserted into an oven inside which the binder is hardened in order to carry out the hardening step.

An important step in this process and the associated plant is that of distribution of the mix on the temporary support, so that for some time various types of mix distributor devices have been known.

Mix distributor devices are known from the documents EP2406046, EP2167295, EP1556197 and EP1802430 and WO2017118901, in the name of the same owner of the present application.

In these distributor devices the supports may have dimensions slightly bigger than the dimensions of the slabs to be made and are formed, for example, by a sheet of paper or by a tray mould made of rubber or other material.

Moreover, some types of such distributors comprise a hopper designed to be filled with a predetermined quantity of mix and an extractor element, preferably a conveyor belt, situated at the outlet of the hopper for transporting the mix downstream.

The supports and the distributor move relative to each other so as to allow the mix to be deposited along the whole length of the support.

For example, a movable distributor and a stationary support surface, or alternatively a stationary distributor and a movable support surface formed by a conveyor belt, may be provided.

The distributors of the first type are called moving weight distributors, while the distributors of the second type are called static weight distributors.

EP1556197 discloses a distributor device with a hopper comprising load cells for detecting the weight of the mix to be loaded and a funnel element situated at the end of the extractor belt for distributing the mix onto and inside the supports by means of gravity.

EP1802430 discloses a distributor device in which the hopper comprises a shaped inner wall lined with an anti-adhesive material. The shaping is intended to guide and convey the mix towards the distributor outlet.

Moreover, this distributor device also has at the end of the extractor belt a funnel inside which the mix is poured by means of gravity and a pair of rotating rolls positioned downstream of the funnel and designed to eliminate by means of crushing the lumps of mix which may form between leaving the hopper and deposition onto the temporary support.

The presence of these lumps is not desirable for the subsequent vibro-compression operation nor within the structure of the final slab.

WO2017118901 discloses a distributor in which the extractor belt comprises a metal mesh covered with a plastic film.

EP2406046 and EP2167295 disclose distributor assemblies also comprising means for dispensing colouring agents onto the surface of the mix before the latter is distributed on the supports.

The distributor devices of the prior art described above, although they are widely used and appreciated in the technical sector in question, have a number of drawbacks.

Firstly, these distributor devices do not allow the distribution of a perfectly uniform layer of mix on the supports.

This drawback results in an increase in the duration of the following step involving compaction of the mix distributed on the supports, since the deaeration and the compaction of a non-homogeneous mix requires more time.

Secondly, these distributor devices do not allow slabs with smaller thicknesses, in particular thicknesses of less than 10 mm, to be formed.

Another drawback of these solutions consists in the fact that, during distribution on the supports, the mix may flake and/or disintegrate. This drawback also complicates the following step of compaction of the mix in the supports, for the reasons indicated above.

A further drawback of these solutions consists in the fact that they do not allow lengthwise streaking and/or limited colouring effects to be provided within the slabs.

Moreover, it is difficult to distribute the colouring agent uniformly within the whole thickness of the slab if special colour effects (for example streaks with contrasting colours) are to be achieved.

In the past, in order to solve this problem, several successive layers of mix with a small thickness were deposited; each layer was coloured by means of deposition of the colouring substance on the upper surface of the layer and diffusion of the colouring substance inside the thickness of the layer. However, this solution complicates substantially the method and increases the production time.

Furthermore, a further drawback of this method consists in the fact that the two sides of the slab may be different from an aesthetic point of view and therefore may not be used in an interchangeable manner, namely using equally well one surface of the slab or the opposite surface as the visible side.

BRIEF SUMMARIES OF OBJECTS OF THE INVENTION

The main object of the present invention is to provide a method and a plant for manufacturing articles made of composite stone material as well as a mix distributor device which are able to overcome the aforementioned drawbacks.

A particular task of the present invention is that of providing a device for distributing a mix for manufacturing articles made of composite stone material, which ensures the deposition of a uniform layer of mix on the forming supports.

A further task of the present invention is that of providing a device for distributing a mix for manufacturing articles of composite stone material, which avoids flaking and/or separation of the mix during distribution on the supports.

Another task of the present invention is that of providing a device for distributing a mix which allows the uniform deposition of a suitably coloured mix so as to obtain continuous longitudinal streaks extending through the whole thickness of the articles.

A further task of the present invention is that of providing a plant comprising the aforementioned distributor device which allows the manufacture of articles, preferably slabs, which have a small thickness, preferably a thickness of not more than 10 mm.

Another task of the present invention is that of providing a distributor device which allows the mix to be distributed so that the finished slabs do not have significant differences in appearance on the two opposite sides.

A further task of the present invention is that of providing a method and a plant for manufacturing articles made of composite stone material where the mix compaction time is of a short duration.

The aforementioned object and main tasks are achieved with a mix distributor device for manufacturing articles made of composite stone material according to claim 1 and with methods and a plant for manufacturing articles according to other claims.

BRIEF DESCRIPTIONS OF THE DRAWINGS

In order to illustrate more clearly the innovative principles of the present invention and its advantages compared to the prior art, examples of embodiment will be described below with the aid of the accompanying drawings. In the drawings.

Figure 5A:
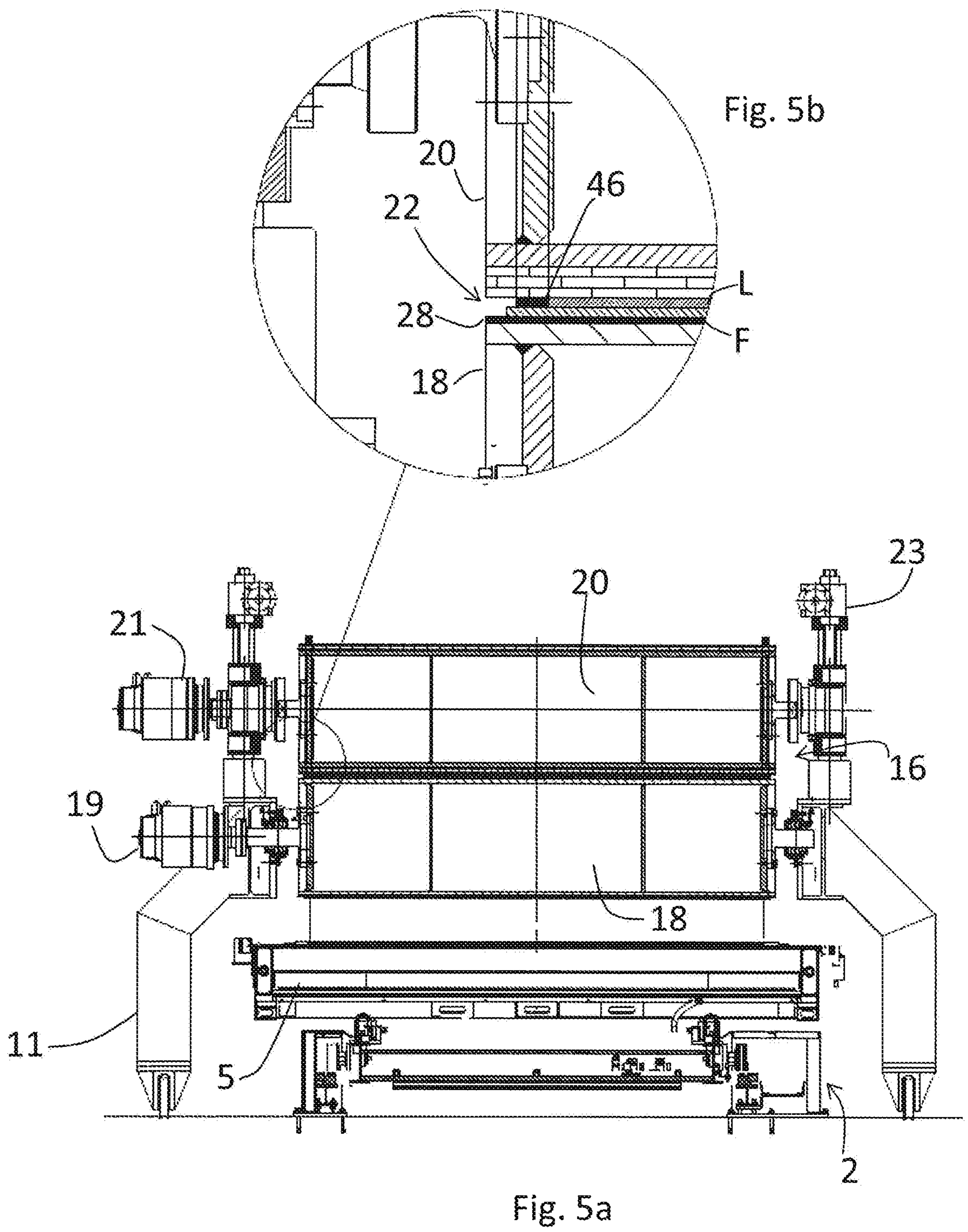
Figure 6:
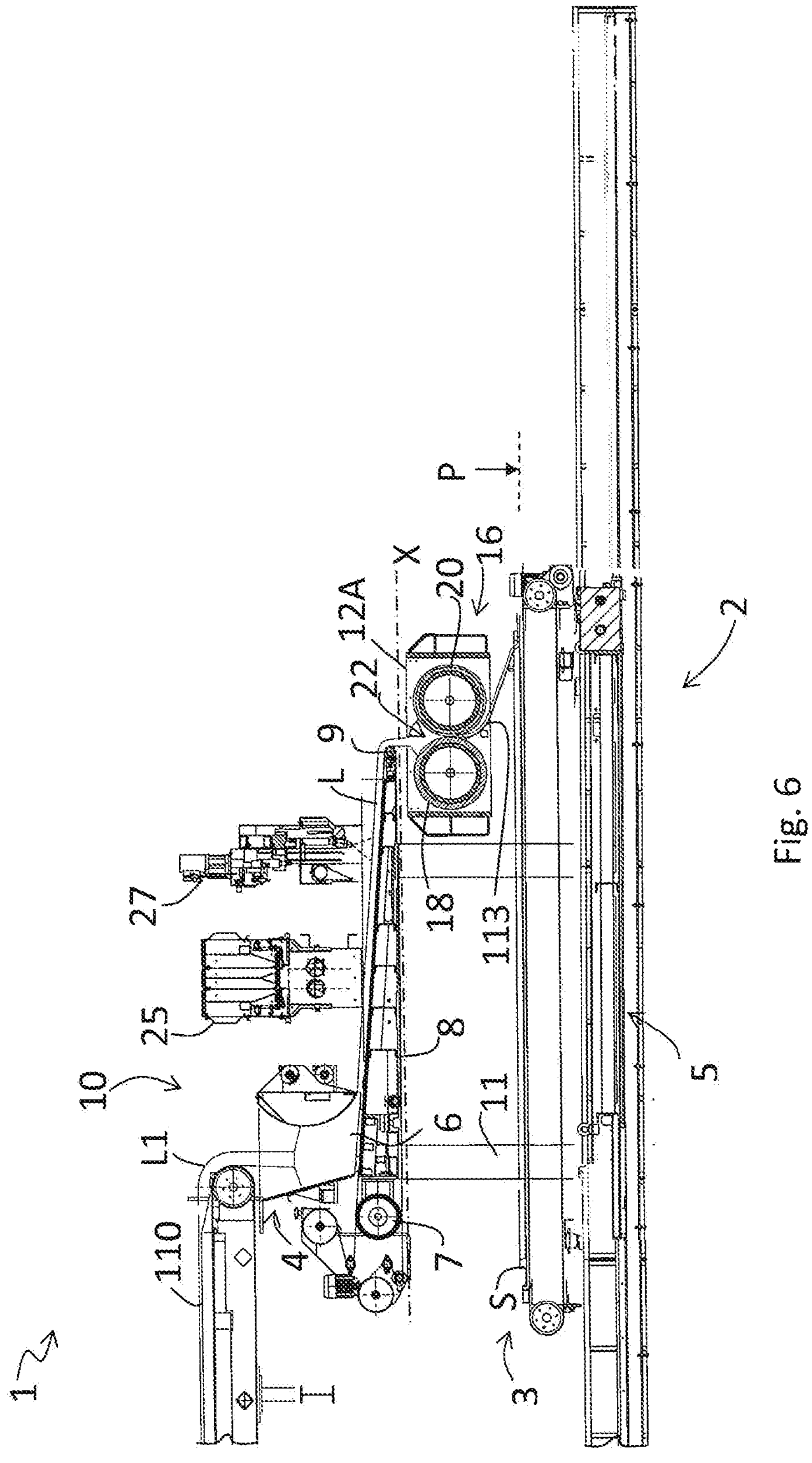
Figure 7:
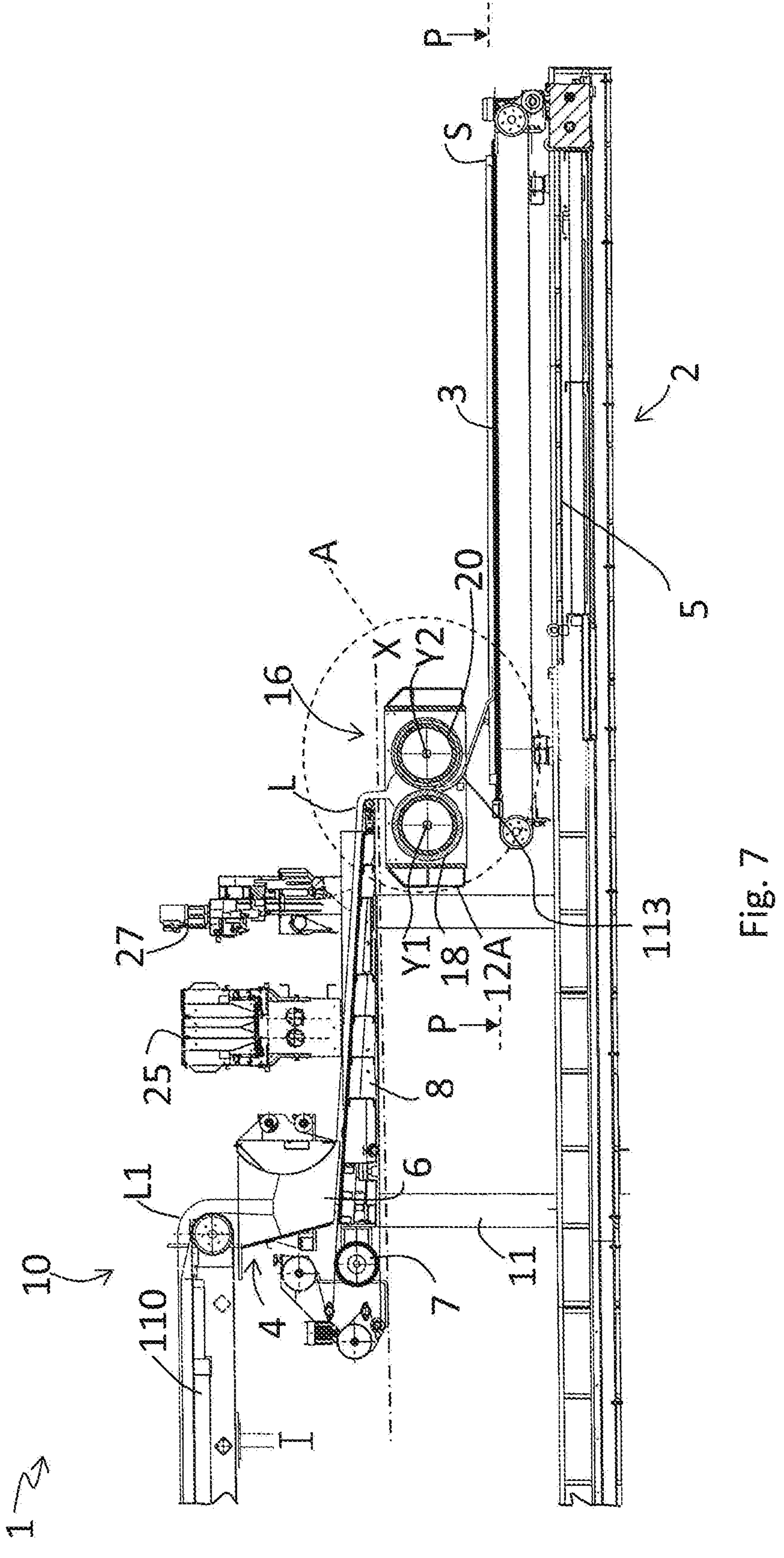
Figure 8:
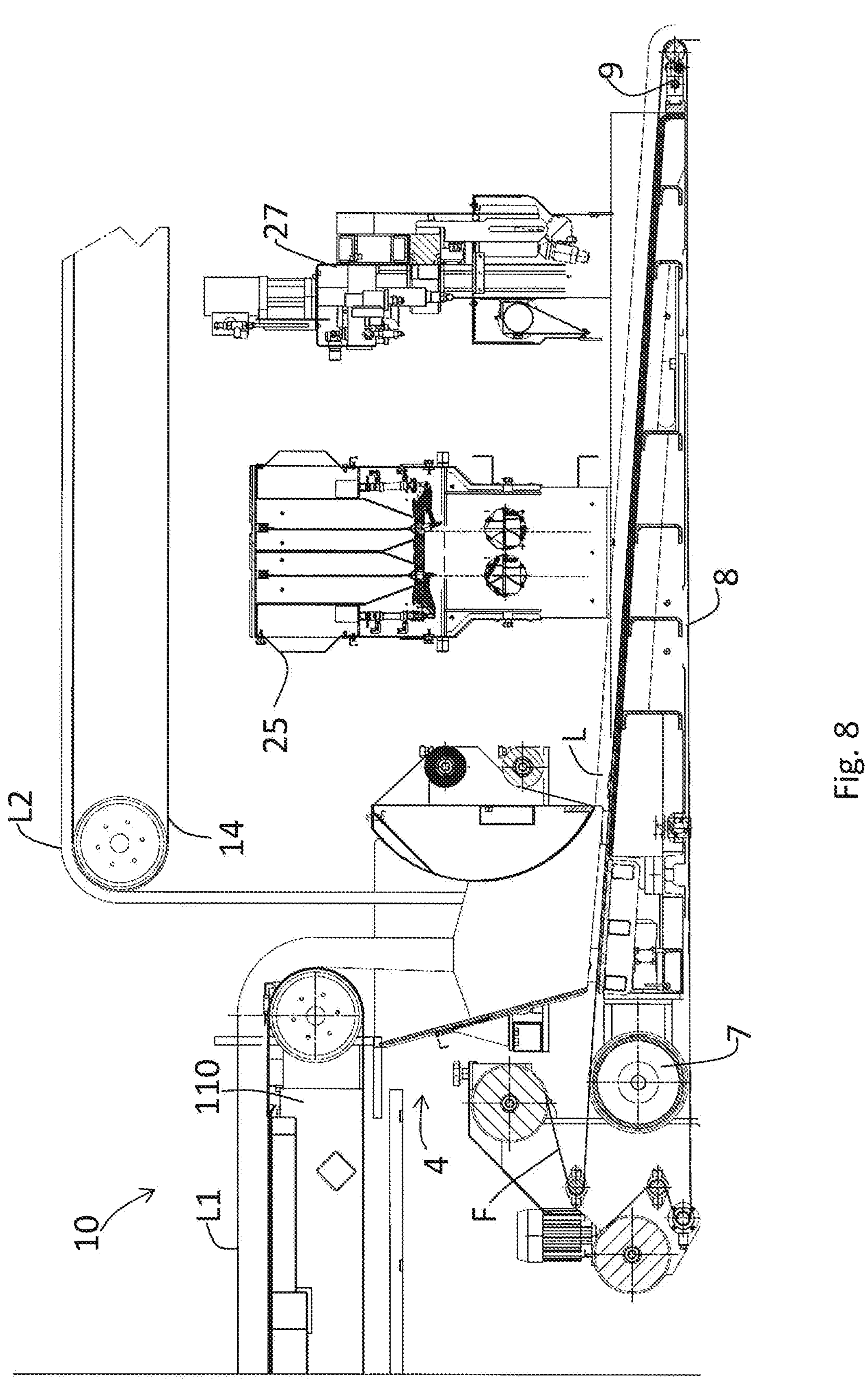
Figure 9:
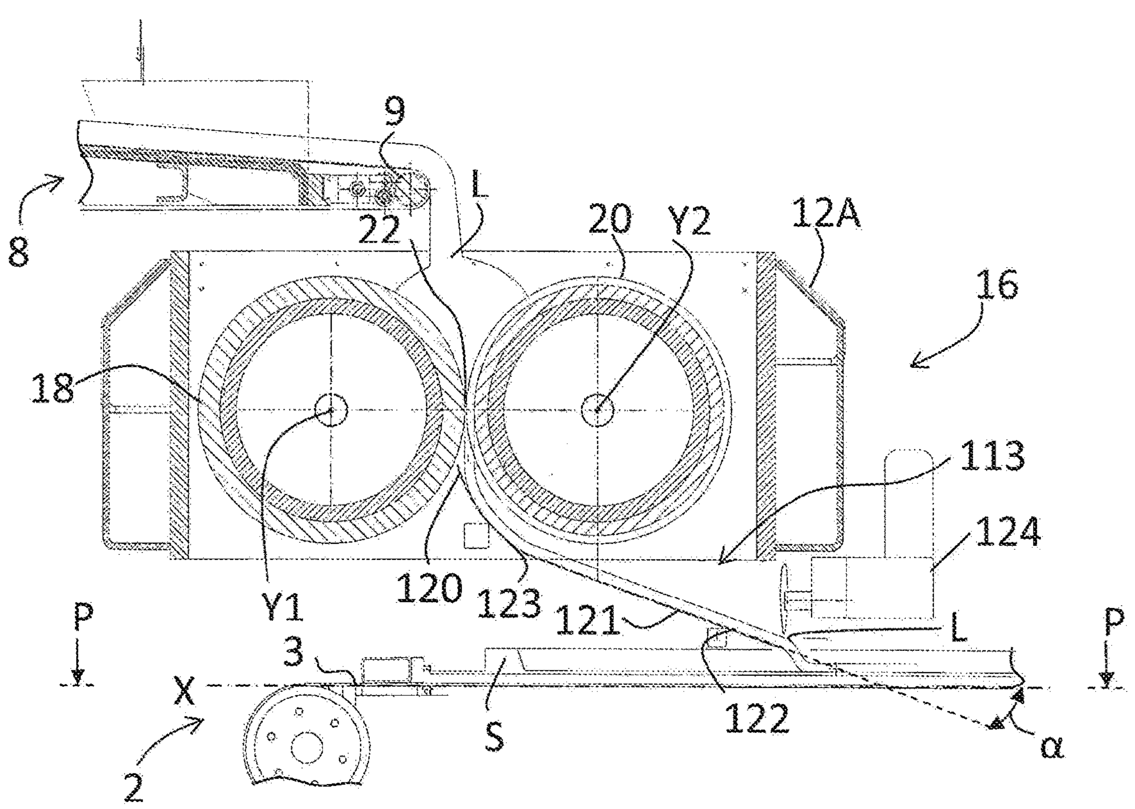
Figure 10:
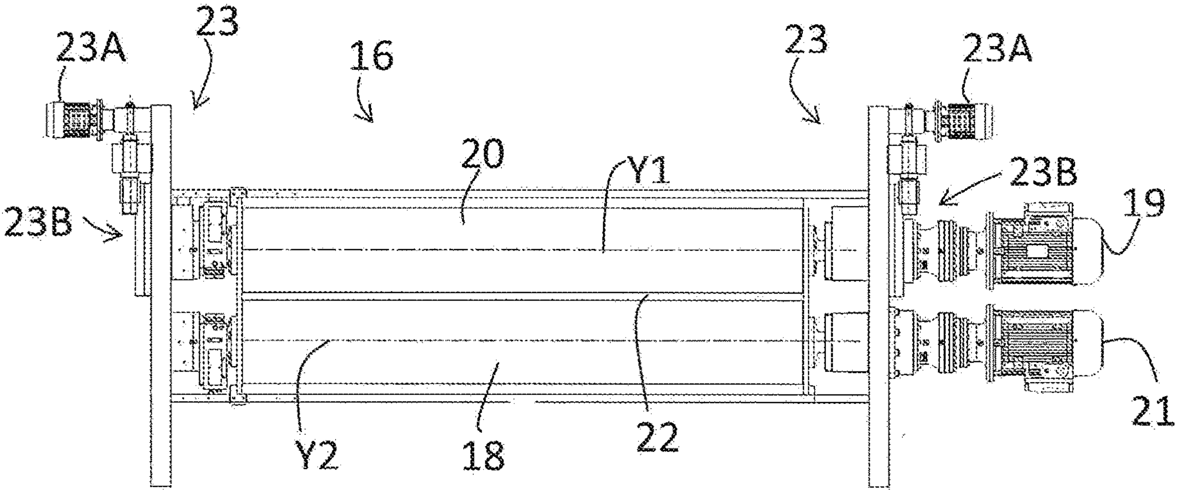
Figure 11:
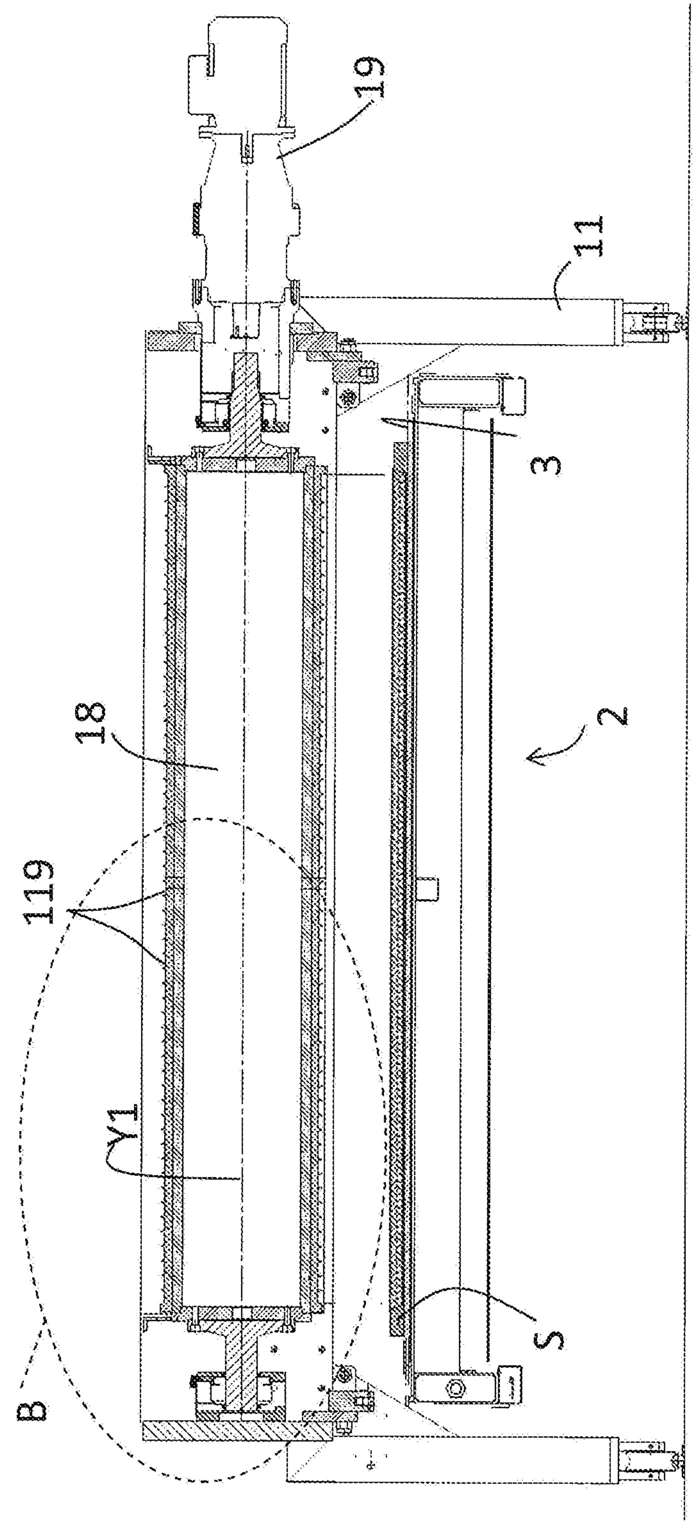
Figure 12:
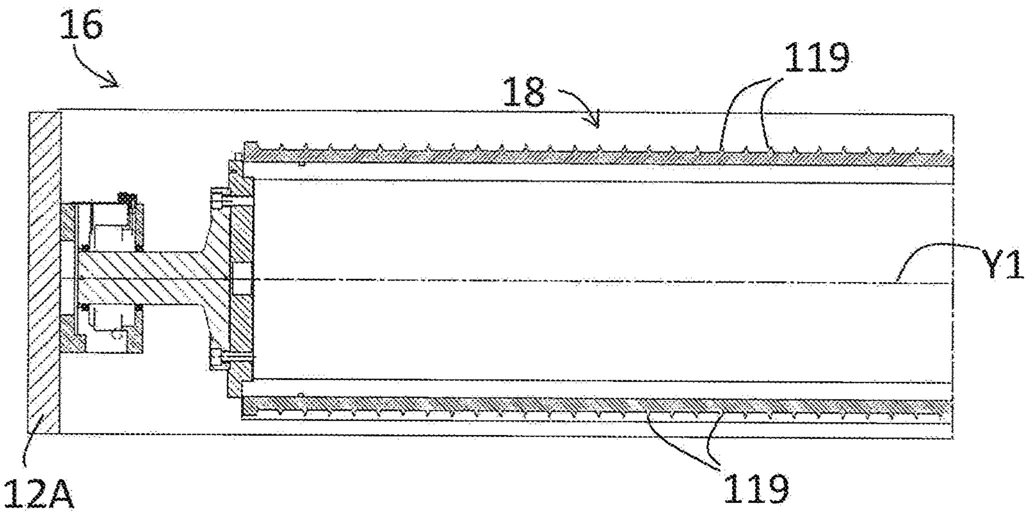
Figure 13:
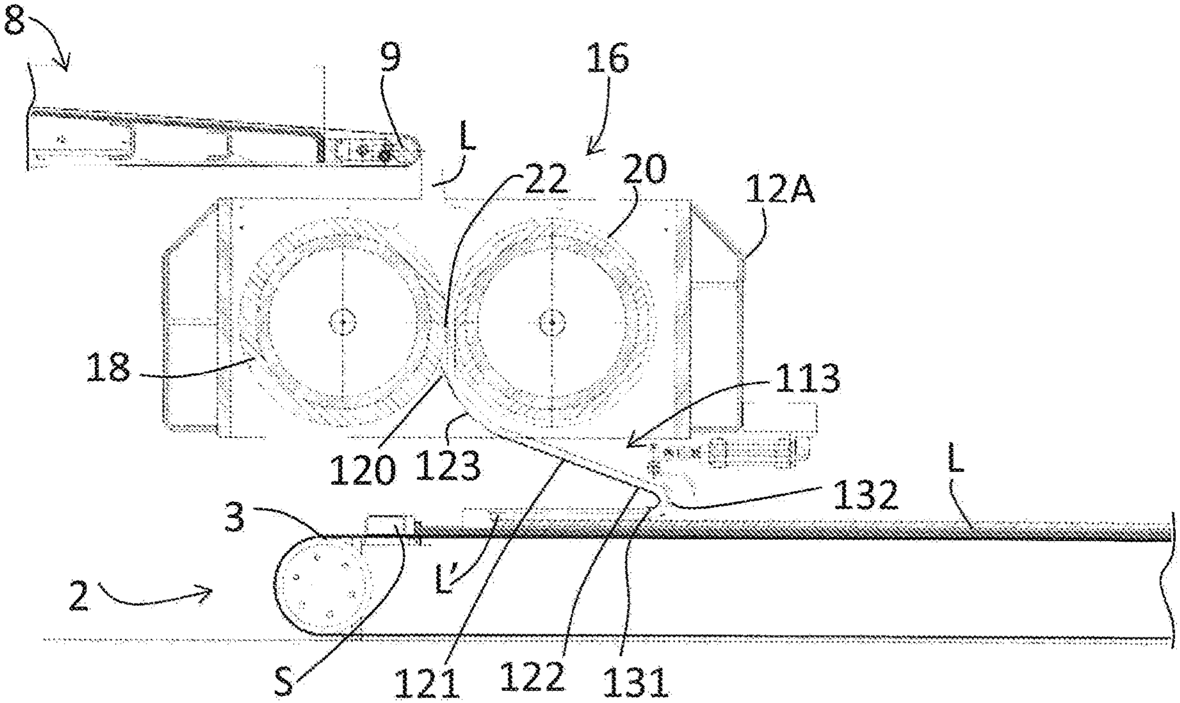
Figure 14A:
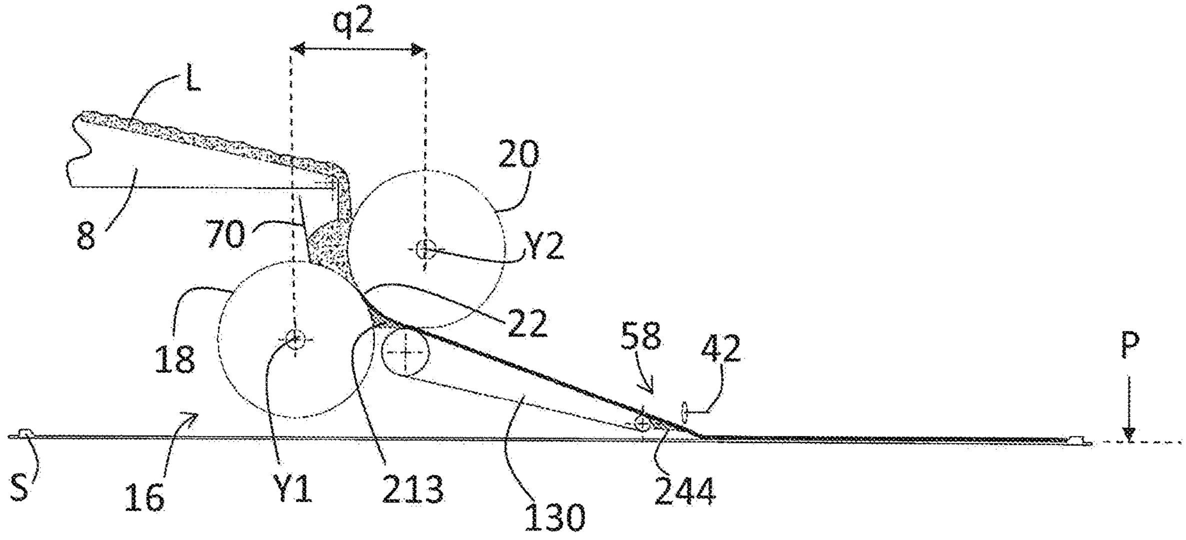
Figure 14B:
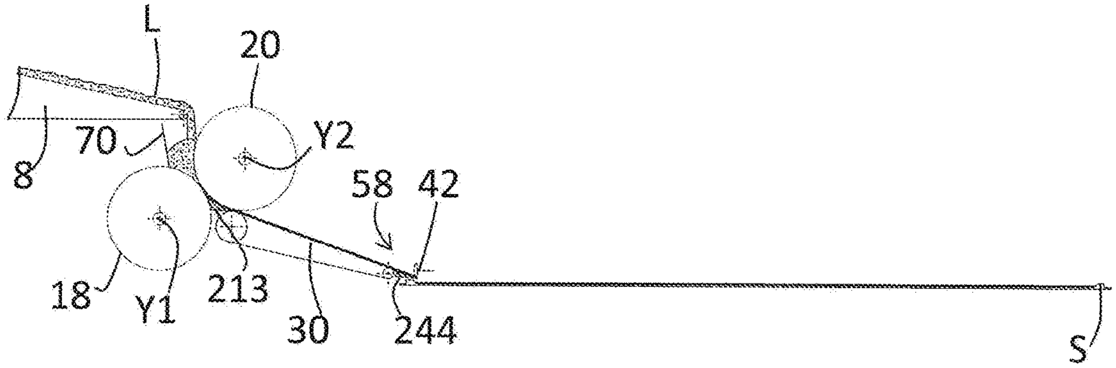

FIGS. 5*a* and 5*b* shows a cross-sectioned view of the distributor device according to the present invention and a respective enlarged detail;

FIG. 6 show a front view of a second embodiment of the distributor device according to the present invention in a first operating position;

FIG. 7 show a front view of the distributor device according to FIG. 6 in a second operating position;

FIG. 8 shows a front view of a portion of the distributor device according to FIG. 6 with an additional detail;

FIG. 9 shows an enlarged front view of the detail indicated by the letter A in FIG. 7;

FIG. 10 shows a top plan view of the detail according to FIG. 9;

FIG. 11 shows a cross-sectioned view along a lamination roll according to FIG. 10;

FIG. 12 shows an enlarged view of the detail indicated by B in FIG. 11;

FIG. 13 shows an enlarged front view of an alternative embodiment, similar to that of FIG. 9;

FIGS. 14*a* and 14*b* are front views of a third embodiment of a detail of the distributor device according to the present invention in a first operating position and second operating position, respectively.

DETAILED DESCRIPTION OF EMBODIMENTS OF THE INVENTION

With reference to the figures, the present invention relates to a distributor device 1 for distributing a mix L on one or more forming supports S for the manufacture of articles, preferably slabs, made of composite stone material.

In particular, FIGS. 1 to 5*b* show a first embodiment of the distributor device 1, FIGS. 6 to 13 show a second embodiment of the distributor device 1 and FIGS. 14*a* and 14*b* show a third embodiment of the distributor device 1.

Conveniently the distributor device 1 is designed to deposit a predetermined quantity of mix L onto the surface of one or more forming supports S having a form and dimensions corresponding to those of the slabs to be made, or also slightly bigger than them.

The supports S may be formed by a sheet of paper or similar material or a tray made of elastomer material, for example rubber, or a similar material, or other materials, for example metal.

When filling of a support S has been completed, the article manufacturing process envisages a subsequent step of compacting the mix, preferably by means of vacuum vibro-compression and a mix hardening step.

For this purpose, the distributor device 1 is installed in a plant for manufacturing material made of composite stone material, not shown in the figures, in a manner known per se in the sector.

The plant comprises, in addition to the distributor device, also a station for compacting, preferably by means of vacuum vibro-compression, the mix deposited on the supports and a station for hardening the mix. Both these stations are situated downstream of the distribution device.

In the case where the binder of the mix is a synthetic resin, the hardening station consists of an oven for hardening the mix L.

The station for performing compaction, preferably by means of vacuum vibro-compression, and the hardening station are connected to the distributor device 1 by suitable movement means, such as conveyor belts, in order to receive the supports S with the mix L previously deposited by the distribution device. These movement means are not shown in the Figures.

In a manner known per se, the compaction station performs the vacuum vibro-compression of the mix by means of a vibrating press which acts on the mix contained in the supports S.

Moreover, the plant may also use other forming methods, such as casting, extrusion, rolling or simple pressing without thereby departing from the scope of protection of the present invention.

During the distribution of the mix L on the forming supports S, the latter and the distributor device 1 are movable relative to each other so as to allow the distribution of the mix L along the whole length of the support S.

Figure 1:
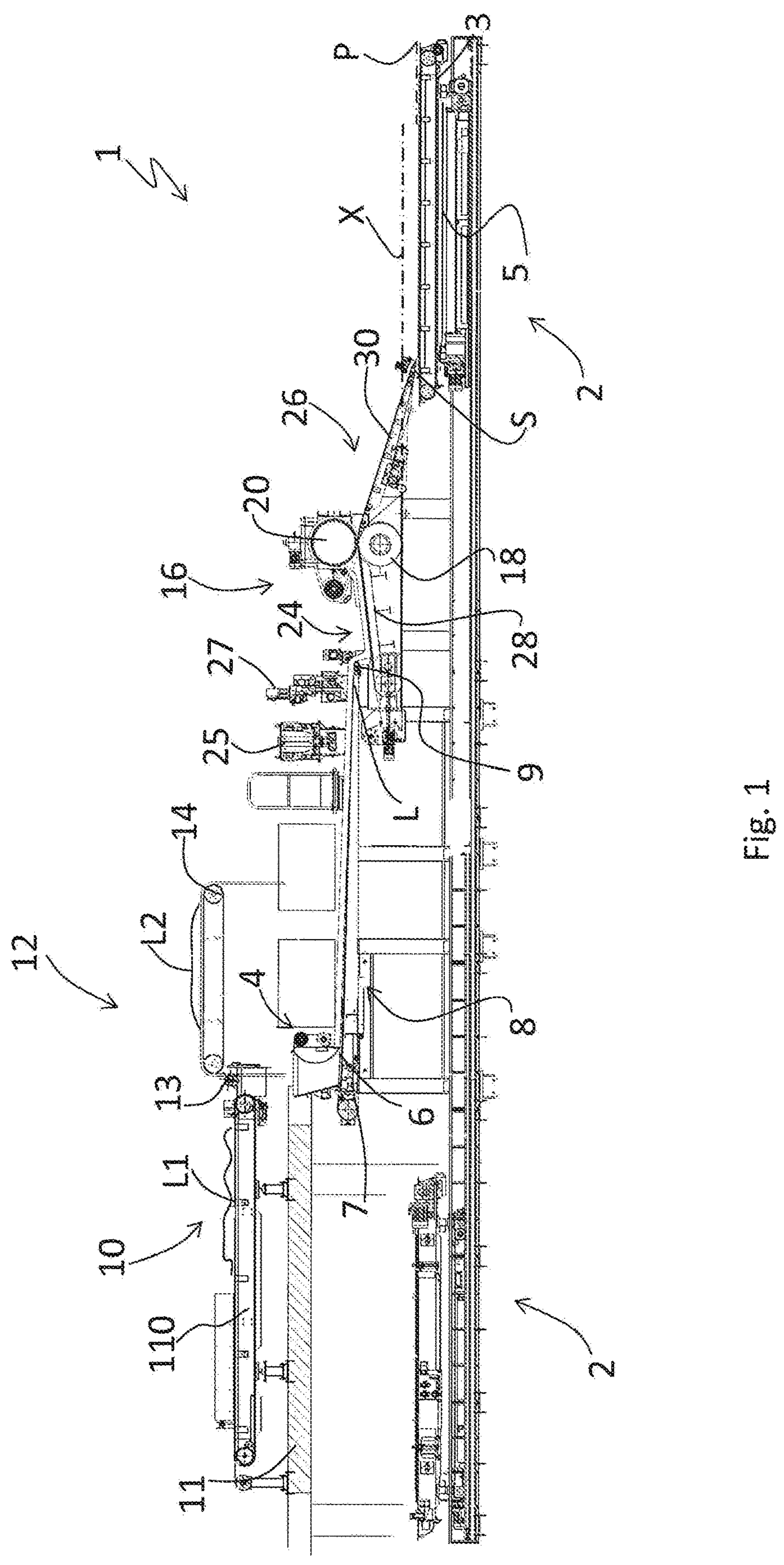
FIG. 1 show a front view of a first embodiment of the distributor device according to the present invention.

In the embodiments shown in the Figures, the supports S are movable along the direction of longitudinal movement X by means of suitable feeding means 2 and the distributor device 1 is fixed, as shown in FIGS. 1, 6, 7.

However, the present invention may also envisage the embodiment where the supports S are kept fixed during the distribution step and the distributor device 1 is movable along the longitudinal direction X, so as to obtain the same operating result described above.

As shown in FIGS. 1-2 and 6-7, the feeding means 2 define a substantially horizontal support surface P for the supports S and comprise a shuttle 5 and a conveyor belt 3 suitable for defining the support surface P.

The shuttle 5 is attached to the conveyor belt 3 and is therefore movable horizontally in the direction X and is designed to support one support S at a time.

When the predetermined quantity of mix L has been entirely deposited on a support S, the latter is transferred and unloaded by the shuttle at the other stations of the plant.

Then the empty shuttle 5 performs a return trip in the opposite direction to the feeding direction so that a new empty support S may be loaded onto the shuttle 5 and undergo the distribution and filling process. Advantageously the shuttle 5 may be movable along a pair of longitudinal rails.

FIGS. 6 and 7 show the shuttle 5 in two different operating positions, namely a first position, shown in FIG. 6, at the start of deposition of the mix L onto the support S and a second position, shown in FIG. 7, at the end of distribution of the mix L on the support S.

FIGS. 14*a* and 14*b* also show a support S in two operating positions similar to those shown in FIGS. 6 and 7; however, in these figures the shuttle is not visible.

In the embodiments shown in the figures, the distributor device 1 comprises means 10 for supplying the mix L, designed to transport the mix in a longitudinal feeding direction X coinciding with the direction of movement X of the supports.

In particular, the supply means 10 comprise a hopper 4 designed to contain a predetermined quantity of mix L and an extractor belt 8, or belt-type extraction device.

The hopper 4 has at least one outlet opening 6 for the mix L and the extractor belt 8 is positioned substantially downstream of and below the hopper 4 and is able to receive the mix L from the outlet opening 6 and transport it towards the support S in the longitudinal feeding direction X.

Therefore, during feeding of the supports S in the longitudinal direction X, the mix L loaded beforehand into the hopper 4 is discharged onto the extractor belt 8.

In the case where two superimposed layers of mix L, L' are to be deposited on the supports S, see FIG. 13 showing the second embodiment of the distribution device 1, the conveyor belt 3 is not operated so as to discharge the support S at the end of distribution of the first layer L and the shuttle 5 performs the reverse travel movement with respect to that described above.

Thereafter the same support S undergoes a second step for deposition of a further layer of mix L', passing again underneath the extractor belt 8.

In the embodiments of the distributor device 1 shown in FIGS. 1-5*b* and 6-13, the extractor belt 8 is wound around a drive roller 7, which allows the operation thereof, and an idle transmission roller 9 which has a diameter smaller than the diameter of the drive roller 7.

In this way, the upstream section of the extractor belt 8, where the mix L is discharged from the outlet opening 6 of the hopper 4, preferably has an inclination downwards in the direction of feeding X, resulting from the difference in the diameters of the drive roller 7 and the transmission roller 9.

In an alternative embodiment not shown in the figures, the rollers 7 and 9 may also have the same diameter; in this case the downwards inclination of the extractor belt 8 is obtained by positioning the transmission roller 9 at a height from the ground lower than that of the drive roller 7.

As shown in FIGS. 1 and 6-8, the supply means 10 also comprise a conveyor belt 110 positioned upstream and above the hopper 4 and designed to supply the hopper 4 with a type of mix L1.

Advantageously, the hopper 4, the extractor belt 8 and the conveyor belt 110 are mounted on a rigid support frame 11 in a position raised with respect to the horizontal support surface P on which the supports S lie during the feeding movement.

Moreover, the hopper 4 may be provided with load cells, not shown in the figures, which are designed to detect the weight of the mix L1 loaded inside it and is preferably internally lined with an anti-adhesive material.

Optionally, further means 12 for supplying the mix may be provided, for example conveyor belts, for conveying into the hopper 4, if necessary intermittently, other mixes of a different kind and/or colour compared to the mix L1, in order to produce a "mottled" layer of mix and thus obtain particular aesthetic effects in the final product.

For this purpose, a mix dispenser 14, illustrated in greater detail in FIGS. 1 and 8 may also be provided, said dispenser comprising a respective conveyor belt and being arranged above the hopper 4.

The mix dispenser 14 is designed to supply into the hopper 4 a further mix L2 which is different, in terms of composition and/or colour, from the mix L1 conveyed by the conveyor belt 110 of the supply means 10.

The conveyor belt of the mix dispenser 14 may have a smaller width than that of the conveyor belt 110 of the supply means 10 and may be movable transversely so as to insert the mix L2 into the hopper 4 in predefined positions along the whole width of the latter.

As shown in FIG. 1, a crushing roller 13 may also be provided, being positioned between the mix dispenser 14 and the hopper 4 and having a function which is well-known in the present state of the art.

Advantageously, the distributor device 1 may comprise at least one dispenser for dispensing a predetermined quantity of colouring agent onto the surface of the mix L being fed on the extractor belt 8.

FIGS. 1-2 and 6-7 show two dispensers 25, 27, situated above and opposite the extractor belt 8, in particular at the terminal end of the extractor belt 8.

The upstream dispenser 25 is preferably configured to dispense a colouring agent in powder form and may comprise a pair of storage tanks provided with electrovalves, while the downstream dispenser 27 is configured preferably to dispense one or more liquid colouring agents.

In addition to the two dispensers, further devices of a varying nature for performing dispensing onto the surface of other coloured mixes may be present.

Even though the components and the elements described above with reference to the first and second embodiments shown in FIGS. 1-5*b* and 6-13, respectively, are not included in the embodiment shown in FIGS. 14*a* and 14*b*, it is to be understood that the third embodiment of the distributor device 1 may also comprise these components and elements.

In accordance with the present invention, the distributor device 1 comprises means 16 for laminating the mix L, positioned between the supply means 10, in particular between the extractor belt 8 and the supports S being fed.

It is pointed out that, in the first embodiment and in the third embodiment of the distributor device 1, shown in FIGS. 1-5*b* and 14*a*-14*b*, respectively, the lamination of the mix L is performed upstream of the step for distribution of the mix L on the supports S; on the other hand, in the second embodiment of the distributor device 1 shown in FIGS. 6-13, the distribution and lamination steps coincide substantially and are simultaneous; therefore, the distribution of the mix L is performed by means of continuous lamination of the mix L on the supports S.

The lamination means 16 are also mounted on the rigid frame 11 of the distributor device 1. Optionally, as shown in FIGS. 6 to 13, the lamination means 16 may be partially housed inside a box-like housing 12A attached to the frame 11.

Preferably the lamination means 16 comprise a first lamination roll 18 and a second lamination roll 20 rotatable about respective horizontal axes Y1, Y2 transverse with respect to the feeding direction X; moreover, the axes Y1 and Y2 are separated by an interspace 22.

The interspace 22 has predetermined dimensions and the positioning of at least one of the two lamination rolls 18, 20 is adjustable so as to vary the dimensions of the interspace 22 depending on the thickness of the mix to be laminated, in the manner described below. In particular, the interspace 22 may have adjustable dimensions of between 6 mm and 30 mm.

Conveniently the rolling rolls 18, 20 may have different directions of rotation and may have substantially the same dimensions, for example a diameter of about 35-40 cm and a length of between 140 and 210 cm.

The lamination rolls 18, 20 preferably comprise an internal metallic roll surrounded by an outer roll made of abrasion-resistant and anti-adhesive material.

In the first embodiment of the distributor device 1 shown in FIGS. 1-5*b*, the axes of rotation Y1, Y2 of the lamination rolls 18, 20 are positioned on top of each other and are arranged vertically offset and also, optionally, horizontally offset.

In particular, the first lamination roll 18 is located below the second lamination roll 20, namely the axis of rotation Y1 of the first roll 18 is located at a smaller distance from the ground than the axis of rotation Y2 of the second roll 20.

Figure 3:
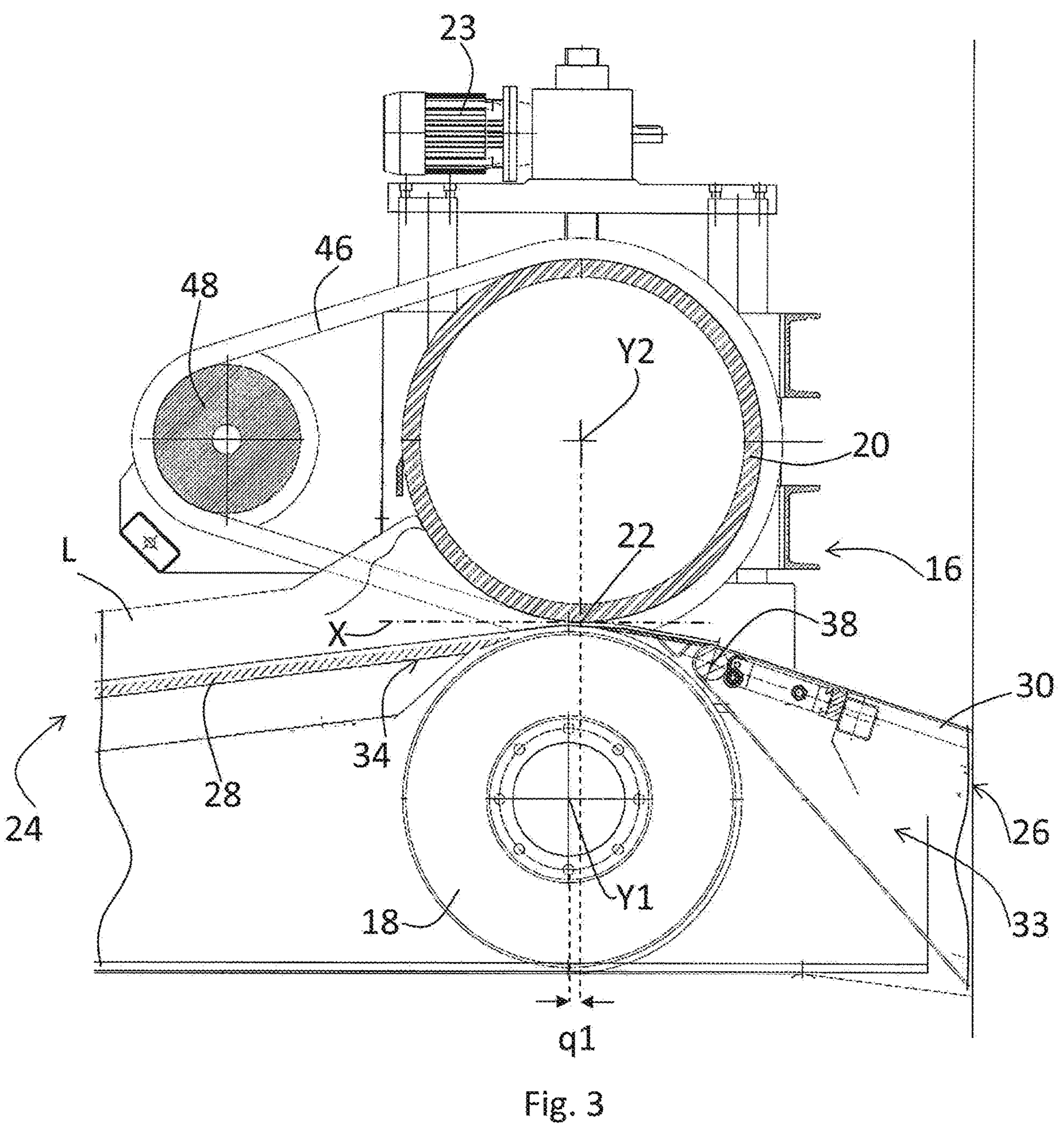
FIG. 3 shows an enlarged front view of a detail of the distributor device according to FIG. 2.

Moreover, the axis of rotation Y2 of the second roll 20 may be arranged horizontally offset by a predetermined dimension q1, preferably not greater than 15% of the dimension of the first roll 18, with respect to the axis of rotation Y1 of the first roll 18 in the longitudinal feeding direction X, as shown in FIG. 3.

The advantage of this characteristic feature is that the compression of the mix L does not occur necessarily in the top part of the first roll 18, but in a part situated further forwards, thus adjusting the area of the rolls where lamination of the mix L is performed.

The rotation is imparted to each of the two lamination rolls 18, 20 by means of a respective drive 19, 21, see for example FIG. 5*a*.

Moreover, as shown in FIGS. 3 and 5*a*, the second lamination roll 20 is provided with motorized adjustment means 23, i.e. a second drive, able to move the second roll 20 so as to adjust the dimensions of the interspace 22, as described above.

In the second embodiment of the distributor device 1 shown in FIGS. 6 to 13, the lamination rolls 18, 20 have horizontal axes of rotation Y1, Y2 offset along the direction of feeding X of the mix.

Therefore, differently from the first embodiment, the two axes of rotation Y1, Y2 are not offset vertically and therefore are located at the same height relative to the ground.

In this embodiment, the mix L falls by means of gravity from the terminal end of the extractor belt 8 into the longitudinal interspace 22 formed between the lamination rolls 18, 20, as shown in FIGS. 6 and 7.

In this embodiment also, each of the lamination rolls 18, 20 is connected to a respective drive 19, 21 and at least one of the two rolls 18, 20 is connected to motorized adjustment means 23, as shown in FIG. 10.

The latter are able to move a roll 20 away from and towards the other roll 18 in order to adjust the size of the interspace 22.

In one possible constructional configuration, these adjustment means 23 comprise, as partially shown in FIG. 10, a motorized mechanism with a pair of gearmotors 23A located at the two opposite ends of the roll 20 and connected to a respective angular transmission which moves a screw.

Each screw engages with a female thread integral with the support plates 23B for the two ends of the roll 20. The plates are slidable along respective guides.

Alternatively, the adjustment of the size of the interspace 22 may also be performed manually by an operator.

Moreover, one of the two lamination rolls 18, 20 may have, on the outer surface, a plurality of uniformly distributed projections 110 designed to channel the mix L passing through the interspace 22 during rotation of the roll 18 so as to form uniform longitudinal streaks in the mix L which is distributed in the supports S, as shown more clearly in FIG. 11.

The projections 119 may be circumferential annular projections which are parallel to each other and equidistant and may have the same height. For example, the distance between the projections 119 may be between 1 cm and 5 cm, while their height may be between 4 mm and 12 mm.

In the embodiment of the distributor device shown in FIGS. 14*a* and 14*b*, the axes of rotation Y1, Y2 of the lamination rolls 18, 20 are offset both vertically and along the longitudinal feeding direction X by a predetermined dimension q2 different from the predetermined dimension q1. The value of this predetermined dimension q2 is preferably between 40% and 95% of the dimension of the diameter of the rolls 18, 20, as shown in FIG. 14*a*.

As can be seen, this predetermined dimension q2 is greater than the predetermined dimension q1 indicated above for the first embodiment of the distribution device; therefore, in this case the lamination rolls 18, 20 are positioned obliquely with respect to each other with an inclination less than that of the first embodiment and preferably between 30° and 60° relative to the horizontal surface P.

The amount of vertical offsetting of the two axes Y1, Y2 in the third embodiment may be the same as or different from the offset amount between the two axes of the first embodiment.

Obviously, this latter embodiment also comprises the drives 19, 21 of the lamination rolls 18, 20 and the motorized adjustment means 23, even though not illustrated in FIGS. 14*a*-14*b*.

Figure 2:
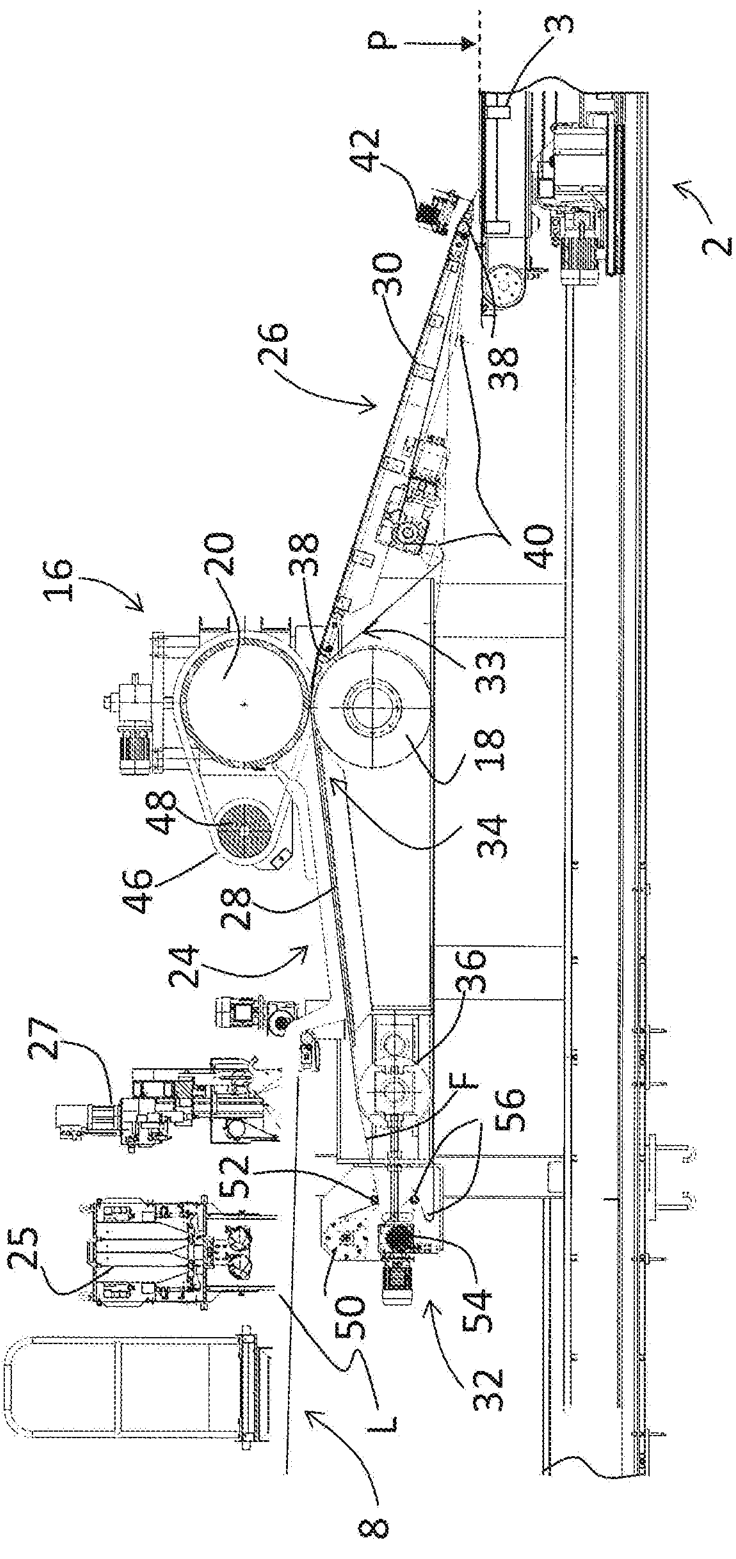
FIG. 2 shows a front view of a portion of the distributor device according to FIG. 1.

In the embodiment shown in FIGS. 1-3, the distribution device 1 also comprises first transportation and support means 24 positioned between the supply means 10, in particular between the extractor belt 8, and the lamination means 16 and second transportation and support means 26 positioned downstream of the rolling means 16.

The first transportation and support means 24 are designed to transport the mix L from the extractor belt 8 to the lamination means 16, while the second transportation and support means 26 are designed to transport the laminated mix L from the lamination means to the supports S being fed.

In this way, the mix L is supported in a stable and continuous manner by the hopper 4 as far as the supports S also during the whole lamination step, avoiding the risk of flaking or separation.

Preferably, the first transportation and support means 24 and the second transportation and support means 26 comprise respective transportation and support belts 28, 30 which are visible more clearly in FIGS. 1-3.

The first transportation and support belt 28 has a first end portion 32 positioned opposite and underneath the extractor belt 8 and a second end portion 34 positioned in the region of the lamination means 16, in particular at the interspace 22 formed between the lamination rolls 18, 20, as illustrated more clearly in FIG. 3.

Therefore, the first transportation and support belt 28 transports the mix L from the extractor belt 8 as far as the interspace 22 formed between the lamination rolls 18, 20 so that it can be laminated.

For this purpose, the first transportation and support belt 28 is wound around the first lamination roll 18 and around an idle transmission roller 36 located opposite and below the extractor belt 8.

The drive 19 of the first lamination roll 18 therefore moves also the first transportation and support belt 28. The first lamination roll 18 supports the second end portion 34 of the first transportation and support belt 28.

As shown more clearly in FIGS. 1 and 2, the transmission roller 36 has a diameter smaller than the diameter of the first lamination roll 18 such that the first transportation and support belt 28 has a predetermined inclination upwards with respect to the feeding direction X and therefore from the transmission roller 36 towards the interspace 22 between the lamination rolls 18, 20.

This configuration results in the formation of a widened area for introducing the mix into the inlet mouth of the lamination rolls 18, 20, this allowing efficient rolling of the mix L to be achieved.

The second lamination roll 20, differently from the first lamination roll 18, around which the first transportation and support belt 28 is wound, instead makes direct contact with the mix L which passes through the interspace 22 so as to be laminated.

The distributor device 1 according to FIGS. 1-5*b* also comprises a pair of belts 46—illustrated more clearly and indicated in FIGS. 2, 3 and 5*b*—which are designed to retain laterally the mix L at the inlet mouth of the interspace 22 between the two lamination rolls 18, 20 when the mix L passes between the two rolls 18, 20.

Alternatively, other means for laterally retaining the mix of a type known per se in the present state of the art are also provided.

In particular, each of the belts 46 is wound around a respective end of the second lamination roll 20 and a respective pulley 48.

The second transportation and support belt 30 of the device shown in FIGS. 1-5*b* is wound around two transmission rollers 38 located at the two ends of the second belt 30 and a series of intermediate transmission rollers 40, one of which is motorized, as shown more clearly in FIG. 2. The second transportation and support belt 30 has an end 33 positioned at the interspace 22 formed between the lamination rolls 18, 20, but on the opposite side to the second end 34 of the first transportation and support belt 28.

The second transportation and support belt 30 has a predetermined inclination downwards along the feeding direction X, namely from the lamination rolls 18, 20 towards the supports S.

Figure 4:
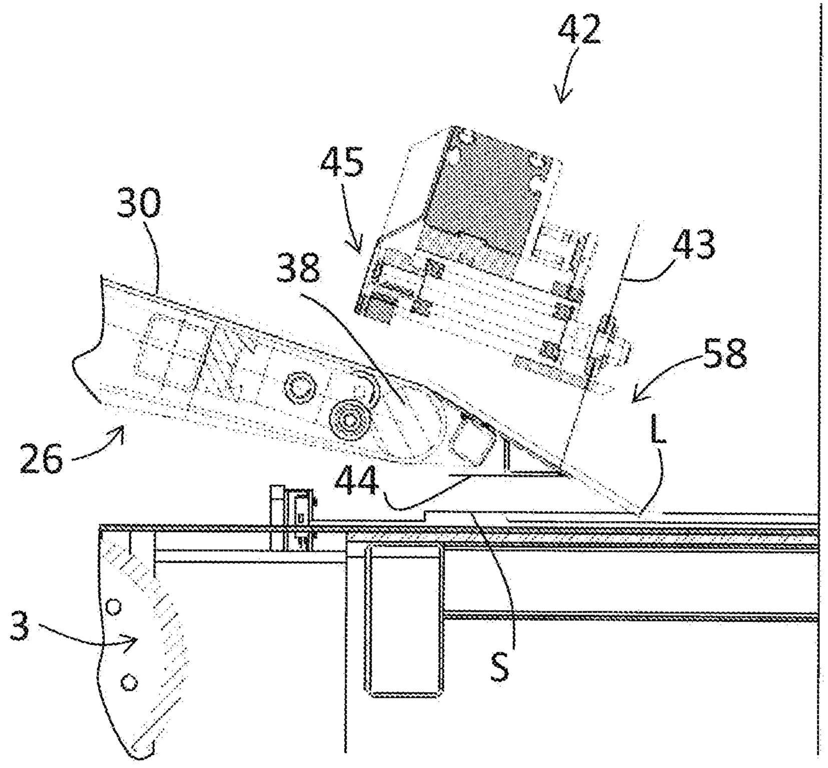
FIG. 4 shows an enlarged front view of a further detail of the distributor device according to FIG. 2.

Moreover, a metallic support element 44 is also provided, positioned at the terminal end 58 of the second transportation and support belt 30, as illustrated more clearly in FIG. 4.

Conveniently, the first and second transportation and support belts 28 and 30 are covered and protected by a protective sheet F, which may be made of paper or plastic and which is taken from a first reel 50 positioned at the end of the first transportation and support belt 28 and underneath the extractor belt 8.

As shown in FIG. 2, the protective sheet F is unwound from the first reel 50, is guided along a first guide roller 52, covers the top part of the first and second transportation and support belts 28 and 30, and finally is wound again around a second reel 54, located underneath the first reel 50, making use of the guiding action of second guide rollers 56.

As can be noted, the distributor device shown in FIGS. 6-13 does not comprise the transportation and support means positioned upstream and/or downstream of the lamination means 16.

However, in this embodiment, the lamination means 16 also comprise a conveyor element 113 which has a shaped profile for allowing the continuous distribution of the mix L on the supports S, which is illustrated more clearly in FIGS. 6, 7, 9 and 13.

The conveyor element 113 is positioned downstream and therefore in a position underneath the lamination rolls 18, 20 which are housed inside the box-shaped housing 12A.

With respect to the lamination means 16 as a whole, the conveyor element 113 is positioned in the region of the lamination roll 18 close to the terminal end of the extractor belt 8 and in flow communication with the interspace 22 formed between the two lamination rolls 18, 20.

In this way, the conveyor element 113 supports and guides the mix L laminated by the rolls 18, 20 towards the supports S and prevents the sheet of mix L from flaking and falling loosely onto the supports S.

As shown in FIGS. 9 and 13, the conveyor element 113 comprises a first portion 120 located underneath and opposite the interspace 22 and a second portion 121 inclined relative to the horizontal and having an end 122 located a predetermined distance from the support surface P.

The first portion 120 and the second portion 121 of the conveyor element 113 are connected by a curved intermediate portion 123. Advantageously, the curved intermediate portion 123 may be shaped in the manner of a circumference arc with its centre coinciding with the axis of the lamination roll 20, as shown in FIG. 9.

In this configuration the first portion 120 is substantially tangential to the roll 20 and is connected to the intermediate portion 123.

Moreover, the angle of inclination α of the second portion 121 relative to the horizontal surface P may be 15° and 25° and preferably close to 20°, as shown in FIG. 9.

This value has been chosen in order to prevent the sheet of mix L from freely sliding and at the same time prevent it from jamming during feeding and therefore represents a suitable compromise designed to ensure easy feeding of the rolled mix L by means of a minimal pushing action exerted by the lamination rolls 18, 20.

The sheet of mix L which passes through the interspace 22 between the lamination rolls 18, 20 and is conveyed by the conveying element 113 to the supports S is therefore compact and cohesive and for this reason may also be distributed with a small thickness in the support S, for example less than 10 mm.

Preferably one or more portions described above of the conveyor element 113 may be lined with a layer of anti-adhesive material, for example Teflon, in order to facilitate sliding of the mix L.

Moreover, the feeding means 2 may be adjustable heightwise in order to vary the distance of the support surface P from the end 122 of the conveyor element 113; alternatively, this distance may be varied by regulating the inclination of the conveyor 113, for example by suitably hinging it on the structure.

In an alternative embodiment of the invention shown in FIG. 13, the end 122 of the conveyor element 113 comprises a first profile folded in the form of a loop or "bird's beak" 131. Moreover, a second profile 132 folded in the form of a loop is provided, being situated opposite the first profile 131 so as to act, together with the first folded profile 131, as a guide channel for the sheet L.

The second loop-like profile 132 may be hinged with or connected to a pneumatic cylinder, so as to pass from a rest position into an operating position close to the first loop-like profile 131, as shown in FIG. 13.

This configuration is particularly advantageous during the step, described above, for depositing a further layer of mix L' onto the preceding layer of mix L already distributed onto a support S by means of movement of the shuttle 5 in the opposite direction to the previous direction.

In fact, the mix L' continues to flow along the loop-like profile 131 during reverse feeding of the support S and is overturned with respect to the previously deposited layer L. In this way, both the bottom side of the layer of mix L in contact with the support S and the bottom side of the layer of mix L'—hence the two sides of the slab to be made—are those which are treated by the lamination roll 18 and which are made to slide down in contact with the conveyor element 113.

Owing to this characteristic feature, both the sides of the slab to be made have practically identical features in terms of appearance and may be used interchangeably for the predefined purposes.

In the case where several layers of mix are present it is preferable that at least the first and the last layer of mix L should be overturned with respect to each other.

Moreover, the distributor device may also comprise a funnel—not shown in the figures—which is located upstream of the lamination rolls and is designed to receive the mix L which falls from the extractor belt so as to direct it towards the rolls.

The embodiment of the distributor device 1 shown in FIGS. 14*a*-14*b* comprises a conveyor belt 130 positioned downstream of the lamination rolls 18, 20. Therefore, in this case there is no transportation and support belt provided upstream of the lamination means 16 and the conveyor belt 130 has the same function as the second transportation and support belt 30 of the first embodiment.

In this connection it is pointed also that the conveyor belt 130 is inclined downwards along a feeding direction X.

This embodiment also comprises:

- a baffle 70 for retaining the mix L, positioned above the first lamination roll 18;
- a curved support 213 positioned between the lamination rolls 18, 20 and the conveyor belt 130 for supporting the mix;
- an inclined support element 244 positioned at the terminal end of the conveyor belt 130.

The curved support 213 has a function similar to that of the conveyor element 113 of the second embodiment, except for the fact that it supports the mix during distribution onto the conveyor belt 130 and not directly onto the supports S. Moreover, the form of the curved support 213 may be different from or similar to the form of the conveyor element 113.

Advantageously, the distributor device 1 according to the present invention may also comprise a device 42 for cutting the mix L.

In the embodiment shown in FIGS. 1-5*b*, the cutting device 42 is positioned at the terminal end 58 of the second transportation and support belt 30, so as to cut the sheet to be arranged on the supports S to a given length.

As shown more clearly in FIG. 4, the cutting device 42 comprises a motorized wheel 43 mounted on a support 45 sliding along a guide arranged transversely with respect to the feeding direction X.

Owing to this characteristic feature, the laminated mix L is fully cut in the transverse direction before it is arranged on the corresponding support S.

Moreover, the metallic support element 44 is positioned below the cutting device 42, as shown more clearly in FIG. 4. The sliding support 45 is inclined and is adjustable heightwise so that the cutting device 42 may be located in a position close to the metal support 44. In this way the wheel 43 is arranged preferably perpendicularly with respect to the mix L and may cut it completely.

In the embodiment shown in FIGS. 6-13, the distributor device 1 comprises a cutting device 124 positioned at the end 122 of the conveyor element 113 and designed to cut transversely the sheet of mix L when the support S in transit has been completely filled, as shown in FIG. 9.

In the third embodiment shown in FIGS. 14*a*-14*b*, the cutting device 42 is positioned at the terminal end 58 of the conveyor belt 30 and is movable between a raised position and a lowered position, as shown in FIG. 14*a* and FIG. 14*b*, respectively.

However, according to an embodiment not shown in the figures, the cutting device 42 could also be positioned downstream of the curved support 213 and upstream of the conveyor belt 130, if the latter should operate not continuously, but in a discontinuous manner (batchwise), and support in each case a quantity of mix L necessary for filling a single support S.

In this latter case, the functioning mode is as follows:

- operation of the extractor belt 8, the two lamination rolls 18,20 and the conveyor belt 130 until a layer of mix L with a length substantially equal to the internal dimension of the supports S is formed on the conveyor belt 130;
- stoppage of the extractor belt 8, the two lamination rolls 18,20 and the conveyor belt 130;
- cutting of the mix L by means of lowering of the wheel 43 of the cutting device 42;

operation of the conveyor belt 130 and movement of the support S to the right in order to transfer the layer of mix from the conveyor belt 130 to the support S;

emptying of the conveyor belt 130 and filling of the support S; repetition of the cycle, with raising first of the cutting wheel 43.

From an operational point of view, in the first embodiment the respective drives 19, 21 of the two lamination rolls 18, 20, the first of which also moves the first transportation belt 28, and the drive of one of the intermediate rolls 40 and therefore of the second transportation and support belt 30, as well as the drive of the roller 7 of the belt extractor 8, are connected to a control unit, not shown in the figures, designed to adjust the speed of rotation of the rolls and the feeding speed of the transportation and support belts 28, 30.

In particular, the control unit may be configured to operate in advance the roller 7 of the belt extractor 8 with respect to the lamination rolls 18, 20. In this way it is possible to accumulate, upstream of the lamination rolls 18, 20, a quantity of mix which acts as a reserve and ensures a constant supply of the mix L to the lamination rolls 18, 20.

After the initial step of accumulating the mix L, the lamination rolls 18, 20 are operated and the peripheral speed of rotation of the lamination rolls 18, 20 is increased to a value the same as or very close to the feeding speed of the second transportation and support belt 30 and the speed of the roller 7 is adjusted so as to ensure a weighted flow of mix L the same as that which is being laminated.

According to an alternative technique, the quantity of mix accumulated upstream of the lamination rolls 18, 20 may be obtained by stopping for a few seconds the first transportation and support belt 28, thus pouring an excess amount of mix from the belt extractor 8 onto the first transportation and support belt 28.

Then the first transportation and support belt 28 is restarted so as to transfer the mix L which has been accumulated towards the lamination rolls 18, 20.

Moreover, the control unit may be configured to set the speed of displacement of the first belt 28 and the second transportation and support belt 30 with substantially the same value.

In the second embodiment, the control unit is connected to the lamination rolls 18, 20, to the extractor belt 8 and to the first feeding means 2 so as to regulate the speed of rotation of the lamination rolls 18, 20 depending on the travel speed of the shuttle 5 of the feeding means 2, so as to supply the supports S with a continuous and regular flow of mix.

Basically, the travel speed of the shuttle 5 must be kept substantially the same as or slightly greater than the speed of rotation of the lamination rolls 18, 20 to avoid unequal distribution of the mix L on the support S.

Alternatively, the control unit may maintain two different speeds of rotation for the two rolls 18, 20. In any case, the speed of rotation of the lamination rolls is chosen with the highest possible value in keeping with the need to ensure a continuous and uninterrupted flow of mix L.

When the two lamination rolls have the same speed of rotation, they may be connected to a single drive motor in a synchronized and counter-rotating manner.

It is also pointed out that the control unit is configured to stop the extractor belt 8 and the lamination rolls 18, 20 once the support S has been completely filled with the predetermined amount of mix L and before cutting the sheet as described above.

In the third embodiment, the extractor belt 8, the lamination rolls 18, 20, the conveyor belt 130 and the belt 3 of the feeding means 2 are operated simultaneously, with the support S which is moved form the left to the right by the feeding means 2 from a first operating position (see FIG. 6*a*) into a second operating position (see FIG. 6*b*).

The present invention also envisages a method for manufacturing articles, preferably slabs, made of composite stone material, comprising a step of providing a predetermined quantity of mix L, a step of distributing at least one first layer of mix L on the surface of one or more forming supports S, a step of compacting the mix L distributed on the supports S and a step of hardening the mix L.

In accordance with a first mode of implementation of the method which uses the first embodiment and the third embodiment of the distribution device 1 described above, a step for laminating the mix L is performed upstream of the step for distributing the mix L on the supports S.

Moreover, this first mode of implementation of the method involves, upstream and downstream of the lamination step, respective steps of transporting the mix by first and second transportation means 24 and 26, of the type described above with reference to the first embodiment of the device.

The third embodiment of the device envisages instead only one step for transporting the mix downstream of the lamination step, by means of the conveyor belt 130.

Alternatively, according to a further mode of implementation of the method which uses the second embodiment of the distribution device 1 described above, the distribution step is performed by laminating the mix and simultaneously distributing it on the supports S. Therefore, the distribution and lamination steps in this embodiment are performed simultaneously.

Moreover, a further step is envisaged where a second layer of mix L' is distributed by means of continuous rolling on top of the first layer of mix L and overturned with respect to the latter.

From the above description, it is now clear how with the distributor device according to the present invention the predefined objects may be advantageously achieved.

In particular, the distributor device ensures the uniform distribution of the mix inside the supports, allowing also slabs with a small thickness to be obtained.

The distributor device according to the present invention prevents the mix from flaking or separating during transfer from the hopper to the supports.

Owing to this latter advantage, the subsequent compaction of the mix inside the supports for forming the articles of composite material may be performed more effectively and rapidly.

Moreover, by means of the distributor device and the plant according to the present invention it is possible to colour the mix and obtain, in the final manufactured article, a plurality of regular and continuous streaking effects.

Finally, the use of the present distributor device helps reduce the overall time needed for manufacture of the articles since the uniform distribution of the mix results in a reduction in the time needed for compaction of the mix distributed in the supports.

Obviously the above description of the embodiments applying the innovative principles of the present invention is provided only by way of example of these innovative principles and must therefore not be regarded as limiting the scope of the rights claimed herein. In particular, the characteristic features of the various solutions shown here may be combined with each other according to specific needs and wishes, as may be easily imagined by the person skilled in the art.

The invention claimed is:

1. A device for distributing a mix onto one or more forming supports for manufacturing slabs made of composite stone material, the device and the forming supports being movable relative to each other, said distributor device comprising:

means for supplying a layer of the mix in a longitudinal feeding direction; and means for laminating the mix, positioned between said supply means and the forming supports and comprising a first lamination roll and a second lamination roll rotatable about respective axes of rotation transverse to the longitudinal feeding direction, the first lamination roll and the second lamination roll being the lamination rolls, rotation being imparted to each of the lamination rolls by means of a respective drive, the forming supports each being formed by a sheet of paper or similar material or by a tray made of elastomer material or similar material and having a form and dimensions corresponding to those of the slabs to be made;

wherein the device comprises a second transportation and support means or a conveyor element or a conveyor belt positioned downstream of said lamination rolls for transporting and guiding the laminated mix from said lamination rolls toward the forming supports;

wherein said lamination rolls are spaced apart by an interspace with predetermined dimensions which can be adjusted in order to perform lamination of the mix, the second lamination roll being provided with a motorized adjustment means able to move the second lamination roll so as to adjust the dimensions of the interspace;

wherein said motorized adjustment means comprise at least one further drive independent from the respective drive for rotation of each of the lamination rolls and connected to at least the second lamination roll of the lamination rolls; and wherein said motorized adjustment means comprise a pair of gear motors located at opposite ends of at least the second lamination roll of the lamination rolls.

2. The device according to claim 1, characterized in that said supply means comprise a hopper designed to contain a predetermined amount of mix and having at least one outlet opening for the mix and an extractor belt positioned downstream of said hopper and designed to receive the mix from said outlet opening.

3. The device according to claim 1, characterized in that the axes of rotation of said lamination rolls are located one on top of the other.

4. The device according to claim 3, characterized in that it comprises first transportation and support means positioned between said supply means/said extractor belt and said lamination means for transporting the mix towards said lamination means.

5. The device according to claim 4, characterized in that said first transportation and support means comprise a first transportation and support belt and said second transport and support means comprise a second transportation and support belt.

6. The device according to claim 5, characterized in that said first transportation and support belt has a first end portion positioned in the region of said extractor belt and a second end portion positioned in the region of said lamination rolls, at the interspace between the lamination rolls, said second transportation and support belt having one end positioned at the interspace between the lamination rolls.

7. The device according to claim 5, characterized in that said first transportation and support belt is wound around said first lamination roll and around an idle transmission roller positioned in the vicinity of said extractor belt, said first transportation and support belt having a predetermined inclination upwards with respect to the direction of feeding of the mix.

8. The device according to claim 5, characterized in that said second transportation and support belt has a predetermined inclination downwards along the direction of feeding of the mix.

9. The device according to claim 5, characterized in that said first and second transportation and support belts are lined with a protective sheet.

10. The device according to claim 3, characterized in that the axes of rotation of said lamination rolls are arranged offset in the longitudinal feeding direction by a predetermined dimension.

11. The device according to claim 1, further comprising at least two belts, each of which is wound around one end of said second lamination roll and a respective pulley, said belts being able to retain laterally the mix being fed when it passes between said lamination rolls.

12. The device according to claim 1, characterized in that the axes of rotation of said lamination rolls are horizontal and located at the same height from the ground, said axes being offset in the longitudinal feeding direction.

13. The device according to claim 12, characterized in that said conveyor element is formed by a shaped profile and is positioned underneath said lamination rolls and in flow communication with said interspace.

14. The device according to claim 13, characterized in that the shaped profile of said conveyor element comprises a first portion located underneath and at the interspace and a second portion inclined with respect to a horizontal surface and having one end located a predetermined height from the forming supports, said first portion and said second portion being connected by a curved intermediate portion.

15. The device according to claim 14, characterized in that said curved intermediate portion is shaped in the manner of a circumference arc having its centre coinciding with the axis of either of the lamination rolls.

16. The device according to claim 14, characterized in that the angle of inclination of the second portion of said conveyor element with respect to the horizontal surface is between 15° and 25°.

17. The device according to claim 14, characterized in that said conveyor element comprises a first profile folded in the manner of a loop at the end of the second portion for distribution onto a support of a further layer of mix overturned with respect to the first layer of mix already distributed on the support and in that it comprises a second profile folded in the manner of a loop situated opposite said first profile so as to act as a guide channel for the mix in combination with said first profile.

18. The device according to claim 1, characterized in that the axes of rotation of the said lamination rolls are arranged offset relative to each other both vertically and in the longitudinal feeding direction by a predetermined dimension.

19. The device according to claim 1, characterized in that it comprises a curved support or slide positioned between said lamination rolls and said conveyor belt and an inclined support element positioned between said conveyor belt and the forming supports being fed.

20. A plant for manufacturing slabs made of composite stone material from a mix distributed on one or more forming supports, which plant comprises:

the device for distributing a layer of the mix in accordance with claim 1 relative to one or more forming supports each formed by a sheet of paper or similar material or by a tray made of elastomer material or similar material;

a station for compacting the mix distributed on the forming supports;

a station for hardening the mix distributed on the forming supports; and means for transporting the supports between said stations.

21. A method for manufacturing slabs made of composite stone material from a mix, comprising the following steps:

preparing a quantity of mix;

distributing a layer of the mix on one or more forming supports, the supports each formed by a sheet of paper or similar material or by a tray made of elastomer material or similar material and having a form and dimensions corresponding to those of the slabs to be made;

compacting the mix distributed in the forming supports;

hardening the mix distributed in the forming supports; and upstream of the mix distribution step, a mix lamination step via means for laminating the mix comprising a first lamination roll and a second lamination roll rotatable about respective axes of rotation, the first lamination roll and the second lamination roll being the lamination rolls, the rotation being imparted to each of the lamination rolls by means of a respective drive; and wherein the method comprises upstream and/or downstream of the lamination step, at least one step for transporting the mix by means of first and/or second transportation means or by means of a conveyor belt; and wherein said lamination rolls are spaced apart by an interspace with predetermined dimensions, whereby dimensions of the interspace to perform lamination of the mix are adjusted via a motorized adjustment means of the second lamination roll for moving the second roll;

wherein said motorized adjustment means comprise at least one further drive independent from the respective drive for rotation of each of the lamination rolls and connected to at least the second lamination roll of the lamination rolls; and wherein said motorized adjustment means comprise a pair of gear motors located at opposite ends of at least the second lamination roll of the lamination rolls.

22. A method for manufacturing slabs made of composite stone material from a mix, comprising the following steps:

preparing a quantity of mix;

distributing a layer of the mix on one or more forming supports, the supports each formed by a sheet of paper or similar material or by a tray made of elastomer material or similar material and having a form and dimensions corresponding to those of the slabs to be made;

compacting the mix distributed in the forming supports; and hardening the mix distributed in the forming supports;

wherein the distribution step is performed by means of lamination for laminating the mix comprising a first lamination roll and a second lamination roll rotatable about respective axes of rotation and simultaneous distribution thereof in the forming supports, the first lamination roll and the second lamination roll being the lamination rolls, the rotation being imparted to each of the lamination rolls by means of a respective drive;

wherein the method comprises at least one step for transporting the mix by means of a conveyor element; and wherein said lamination rolls are spaced apart by an interspace with predetermined dimensions, whereby dimensions of the interspace to perform lamination of the mix are adjusted via a motorized adjustment means of the second lamination roll for moving the second roll;

wherein said motorized adjustment means comprise at least one further drive independent from the respective drive for rotation of each of the lamination rolls and connected to at least the second lamination roll of the lamination rolls; and wherein said motorized adjustment means comprise a pair of gear motors located at opposite ends of at least the second lamination roll of the lamination rolls.

23. The method according to claim 22, characterized in that, before said compaction step, a step may be provided where distribution is performed by means of continuous lamination of at least one second layer of mix on top of the first layer of mix and overturned with respect thereto.

* * * * *